United States Patent
Crook

(10) Patent No.: US 10,634,411 B2
(45) Date of Patent: *Apr. 28, 2020

(54) ENERGY EFFICIENT REFRIGERATED ROOM WITH OPTIONALLY ASSOCIATED GEOTHERMAL EARTH LOOP SYSTEM

(71) Applicant: Heartswork, LLC, Coatesville, PA (US)

(72) Inventor: Dennis Maq Crook, Coatesville, PA (US)

(73) Assignee: Heartswork, LLC, Coatesville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/925,986

(22) Filed: Mar. 20, 2018

(65) Prior Publication Data

US 2018/0209714 A1 Jul. 26, 2018

Related U.S. Application Data

(63) Continuation-in-part of application No. 15/188,168, filed on Jun. 21, 2016, now Pat. No. 9,920,518, which
(Continued)

(51) Int. Cl.
*F25D 13/00* (2006.01)
*F25D 23/06* (2006.01)
(Continued)

(52) U.S. Cl.
CPC .............. *F25D 13/00* (2013.01); *E04B 1/625* (2013.01); *E04B 1/7654* (2013.01);
(Continued)

(58) Field of Classification Search
CPC ........ F25D 13/00; F25D 23/068; E04B 1/625; E04B 1/7675; E04B 1/7654; F25B 30/06;
(Continued)

(56) References Cited

U.S. PATENT DOCUMENTS 2,584,573 A 2/1952 Gay
3,415,714 A 12/1968 Hider
(Continued)

FOREIGN PATENT DOCUMENTS

CA 2 510 701 A1 6/2005

OTHER PUBLICATIONS

Heat Recovery in the refrigeration cycle by Siemens Building Technologies, 0-91915-en, Dowloaded 2013 from: http://www.hqs.sbt.siemens.com/gip/general/dlc/data/assets/hq/Heat-recovery-in-the-refrigeration-cycle_8357.
(Continued)

*Primary Examiner* — Frantz F Jules
*Assistant Examiner* — Martha Tadesse
(74) *Attorney, Agent, or Firm* — Woodard, Emhardt, Henry, Reeves & Wagner, LLP

(57) ABSTRACT

A cooling and heating system may include a first heat exchange loop and a second heat exchange loop. The first heat exchange loop may include a first heat transfer fluid contained in a first pipe loop effective for passing the first heat transfer fluid between a set of functional elements remote from each other. The first pipe loop optionally includes an underground portion extending into the ground to a depth of at least 5 feet. The first heat exchange loop may also include a chiller effective for providing refrigerated air to a refrigerated space, with the first chiller using the first heat transfer fluid to cool air for the refrigerated space. The first heat exchange loop may also include a manifold for selectively directing heat transfer fluid from said the chiller to one or more remote functional elements. The first heat exchange loop may also include a heat pump effective for receiving the first heat transfer fluid and for using the first heat transfer fluid to warm air for a living or working space when heating is desired for the living/working space, and
(Continued)

additionally effective for using a second heat transfer fluid to cool air for a living or working space when cooling is desired for the living/working space. The first heat exchange loop may also include a water heater that uses the first heat transfer fluid to transfer heat to a first fluid differing in composition from said heat transfer fluid. The second heat exchange loop may have a second heat transfer fluid contained in a second pipe loop effective for passing the second heat transfer fluid between an underground portion and the heat pump of the first heat exchange system, with the second pipe loop optionally including an underground portion extending into the ground to a depth of at least 5 feet. The system may include valves for selectively controlling the flow of the first and second heat transfer fluids to and from the first heat pump such that heat transfer fluid may be directed to or from the first heat pump to or from either said first pipe loop or said second pipe loop, or both.

3 Claims, 8 Drawing Sheets

Related U.S. Application Data is a continuation-in-part of application No. 14/024,684, filed on Sep. 12, 2013, now Pat. No. 9,372,017.

(60) Provisional application No. 61/700,624, filed on Sep. 13, 2012.

(51) Int. Cl.
*E04B 1/76* (2006.01)
*E04B 1/62* (2006.01)
*F24T 10/10* (2018.01)
*F25B 30/06* (2006.01)
*F25B 25/00* (2006.01)

(52) U.S. Cl.
CPC ............ *E04B 1/7675* (2013.01); *F24T 10/10* (2018.05); *F25B 30/06* (2013.01); *F25D 23/068* (2013.01); *F25B 25/005* (2013.01); *F25B 2339/047* (2013.01)

(58) Field of Classification Search
CPC .. F25B 2339/047; F25B 29/00; F25B 29/003; F25B 25/005
See application file for complete search history.

(56) References Cited

U.S. PATENT DOCUMENTS

| | | | |
|---|---|---|---|
| 3,878,694 A | 4/1975 | Holmsten | |
| 4,050,145 A | 9/1977 | Benford | |
| 4,215,551 A | 8/1980 | Jones | |
| 4,261,176 A | 4/1981 | Theyse | |
| 5,466,504 A | 11/1995 | Gavin et al. | |
| 6,125,608 A | 10/2000 | Charlson | |
| 6,244,063 B1 | 6/2001 | Yates | |
| 6,656,858 B1 | 12/2003 | Cahill | |
| 6,688,129 B2 | 2/2004 | Ace | |
| 7,228,696 B2 * | 6/2007 | Ambs | F25B 13/00 62/260 |
| 2003/0221436 A1 | 12/2003 | Xu | |
| 2004/0003617 A1 | 1/2004 | Changler et al. | |
| 2006/0080994 A1 | 4/2006 | Seiden et al. | |
| 2006/0093808 A1 | 5/2006 | Sullivan | |
| 2009/0095006 A1 | 4/2009 | Smith et al. | |
| 2009/0211727 A1 | 8/2009 | Yin et al. | |
| 2010/0064710 A1 | 3/2010 | Slaughter | |
| 2011/0023516 A1 | 2/2011 | Dazza | |
| 2011/0197599 A1 * | 8/2011 | Stewart | F03G 7/04 62/56 |
| 2012/0037335 A1 | 2/2012 | Asai et al. | |
| 2012/0318491 A1 | 12/2012 | Melink | |

OTHER PUBLICATIONS

New Approach Offers Opportunity for More Efficient Waste Heat Recovery from Regrigeration Systems by Georgia Tech Research Institute, Food Processing Technology Division, Apr. 2010.
Assessment of Hybrid Geothermal Heat Pump Systems by Federal Energy Management Program, DOE/EE-0258, Dec. 2001, 12 pps.
Fricke, Brian A., "Waste Heat Recapture from Supermarket Refrigeration Systems", Final Report submitted to Refrigeration Project Team, Retail Energy Alliance, Oct. 4, 2011.
Heat Recovery in the refrigeration cycle by Siemens Building Technologies, 0-91915-en, Dowloaded 2013 from: http://www.hqs.sbt.siemens.com/gip/general/dlc/data/assets/hq/Heat-recovery-in-the-refrigeration-cycle_8.
How to implement heat recovery in refrigeration by Carbon Trust, CTL056, downloaded 2013 from: http://www.carbontrust.com/media/147189/j8088_ctl056_heat_recovery_in_refrigeration_aw.pdf.
New Approach Offers Opportunity for More Efficient Waste Heat Recovery from Refrigeration Systems by Georgia Tech Research Institute, Food Processing Technology Division, Apr. 2010.
Transform the waste heat from your cooling system intro profits by Therma-Stor LLC, Apr. 2007, Downloaded 2013 from: http://www.thermastor.com/Heat-Recovery-Water-Heaters/Heat-Recovery-Systems-Brochure.pdf.

* cited by examiner

ENERGY EFFICIENT REFRIGERATED ROOM WITH OPTIONALLY ASSOCIATED GEOTHERMAL EARTH LOOP SYSTEM

CROSS-REFERENCE TO RELATED APPLICATIONS

This application is a continuation-in-part of U.S. patent application Ser. No. 15/188,168, filed Jun. 21, 2016, which is a continuation-in-part of U.S. patent application Ser. No. 14/024,684, filed Sep. 12, 2013, which claims the benefit of U.S. Provisional Application No. 61/700,624, filed Sep. 13, 2012. The entire contents of each related application is hereby incorporated herein by reference.

BACKGROUND OF THE INVENTION

Convenience stores typically require refrigeration and/or freezing capacity and a source of cool air when ambient temperatures are too warm. Convenience stores also frequently require a source of hot water for store use and/or for use in an associated car wash, laundromat, etc., and may require a source of warm air when ambient temperatures are too cool.

Providing the required cooling and heating capacity can be expensive for convenience stores, or for any facility requiring both cooling and heating. While improvements have been made in energy-efficient cooling and heating, there are still gains and improvements to be made across the various technologies.

A need exists for energy efficient cooling and heating, particularly for use in a convenience store environment. The present invention addresses that need.

SUMMARY OF THE INVENTION

A cooling and heating system with a first heat exchange loop and a second heat exchange loop. The first heat exchange loop uses a first heat transfer fluid that is passed through a compression/evaporation refrigeration cycle to cool a refrigerated space and to collect waste heat, and then pumps that heat transfer fluid to a remote heat pump in the winter where the waste heat is used to improve the efficiency of the heat pump. The first heat exchange loop may also pump the first heat transfer fluid to a remote water heater where the waste heat is used to heat water. The heat transfer fluid is then passed through an underground earth loop portion where it is cooled to about 55°. The second heat exchange loop uses a second heat transfer fluid to cool the heat pump in the summer, and also includes a second underground earth loop. The first underground earth loop portion and the second underground earth loop portion may be interconnected so that a single heat transfer fluid flows through both heat exchange loops.

In one embodiment the first heat exchange loop of the inventive cooling and heating system comprises:
 a first heat transfer fluid, contained in a first pipe loop effective for passing said first heat transfer fluid between a set of functional elements remote from each other, wherein said first pipe loop includes an underground portion extending into the ground to a depth of at least 5 feet and having an input and an output;
 a first functional element comprising a first chiller effective for providing refrigerated air to a refrigerated and/or freezer space, wherein said first chiller uses said first heat transfer fluid to cool air for the refrigerated and/or freezer space, and wherein said first heat transfer fluid absorbs heat during that cooling process;
 a manifold for selectively directing heat transfer fluid from said first chiller to one or more remote functional elements;
 a second functional element comprising a heat pump effective for receiving said first heat transfer fluid and for using said first heat transfer fluid to warm air for a living or working space when heating is desired for the living/working space, and additionally effective for using a second heat transfer fluid to cool air for a living or working space when cooling is desired for the living/working space; and
 a third functional element comprising a first water heater that uses said first heat transfer fluid to transfer heat to a first fluid differing in composition from said heat transfer fluid.

In one embodiment the second heat exchange loop of the present invention comprises a second heat transfer fluid contained in a second pipe loop effective for passing said second heat transfer fluid between an underground portion and the heat pump of the first heat exchange system, wherein said second pipe loop includes an underground portion extending into the ground to a depth of at least 5 feet and having an input and an output. Valves may be provided for selectively controlling the flow of the first and second heat transfer fluids to and from the first heat pump such that heat transfer fluid may be directed to or from said first heat pump to or from either said first pipe loop or said second pipe loop, or both.

DESCRIPTION OF THE INVENTION

Figure 1:
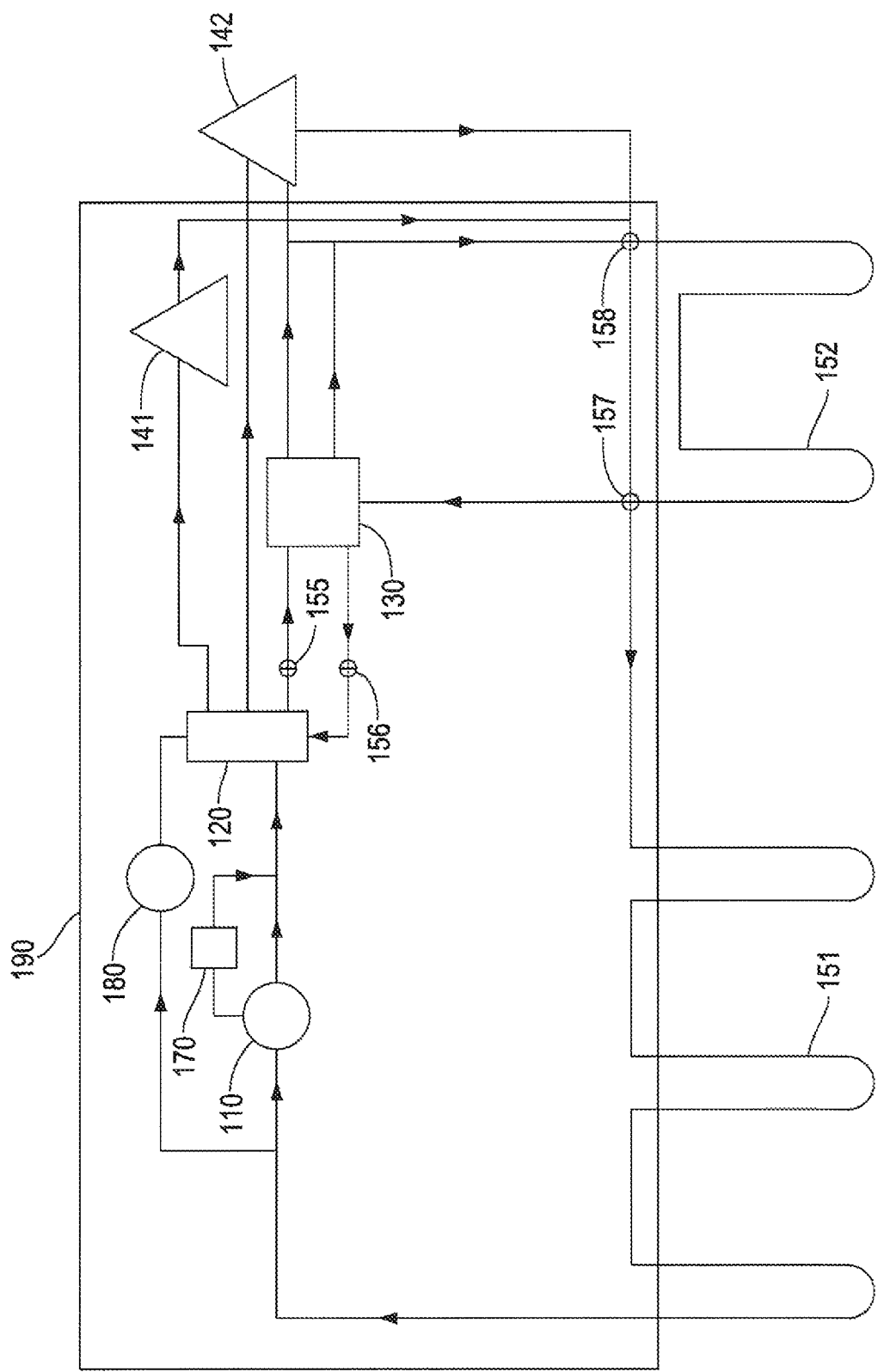
FIG. 1 is a diagram of one embodiment of the energy efficient cooling and heating system of the present invention.

For the purposes of promoting an understanding of the principles of the invention, reference will now be made to certain preferred embodiments and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

1. Geothermal Earth Loop System.

In one aspect of the present invention there is provided a cooling and heating system, comprising a first heat exchange loop and a second heat exchange loop. A first heat transfer fluid flows through the first heat exchange loop and a second heat transfer fluid flows through the second heat exchange loop. The first heat exchange loop preferably includes a first underground earth loop portion and the second heat exchange system preferably includes a second underground earth loop portion. The two heat exchange loops are preferably interconnected to allow a single heat transfer fluid to flow through the combined system, thus transferring heat from the first heat exchange loop to the second heat exchange loop when that condition is desired. However, the interconnection also preferably allows the flow of heat transfer fluid from the first loop to the second loop to be blocked so that the two heat exchange fluids do not co-mingle and exchange heat when that condition is desired.

In the most preferred embodiments the two systems are interconnected so that in the heating season waste heat from a chiller in the first heat exchange loop is transferred to a heat pump that is connected to both the first and second heat exchange loops to improve the efficiency of that heat pump, but in the cooling season that heat pump may be isolated from the waste heat that is captured from the chiller of the first heat exchange loop. Secondary uses of waste heat, such as water heaters to provide hot water for personal use and/or for a car wash or Laundromat may be connected to either or both of the first and second heat exchange loops.

a. First Heat Exchange Loop i) First Pipe Loop and First Heat Transfer Fluid

The first earth loop heat exchange system of the present invention preferably comprises a first pipe loop with a first heat transfer fluid contained in that loop. The first heat transfer fluid should be effective for transferring heat between a set of functional elements. The first pipe loop preferably includes an underground portion extending into the ground. In one embodiment the underground portion extends into the ground to a depth of at least 5 feet, and more preferably to a depth of at least 10 feet. The underground portion may be in trench form or vertically in wells which may be hundreds of feet deep, or in bodies of water deeper than 10 feet. The underground portion preferably has an input and an output.

The first pipe loop may be made of plastic pipe with a 50 year life expectancy. Portions of the pipe loop may be encased in grout, and other portions may be in direct contact with the ground. Any portions of the pipe loop that go underground preferably are set in the ground at 5' or deeper, and preferably 10' or deeper, to gain the benefit of constant ground temperature. It is preferable to drill wells to a depth of 500', but other depths may be used if geological features make deep loops too costly. The pipe loop(s) may extend vertically or horizontally as desired.

Closed loop systems are preferred over open loop systems for environmental reasons since they protect water quality. It is recommended that any ground loops be positioned at least 10 feet apart and 10 feet from other structures.

The underground portion of the pipe loop is in thermal contact with the ground so that heat may be transferred into or away from the heat transfer fluid in the pipe. Depending on the geologic location, the underground portion of the pipe loop will have a constant temperature of between 39-75 degrees Fahrenheit.

The heat transfer fluid may be a refrigerant, and most preferably comprises a glycol or a glycol/water mixture. In one embodiment the heat transfer fluid is a 60:40 mixture of glycol:water.

One or more pumps may be incorporated into the system to pump the heat transfer fluid to the various portions of the loop.

As disclosed herein, the first pipe loop will transfer waste heat (energy) from inside the refrigeration and freezing units above ground to a heat pump and/or indirect water heater(s). Any waste heat not utilized will be pumped back into the ground at the opposite end.

ii) Chiller and Optionally Associated Components.

The first heat exchange loop preferably includes a chiller to cool a refrigerator or freezer, and captures waste heat from that cooling process in the heat transfer fluid. The heat transfer fluid is then moved to a remote location where the waste heat in the heat transfer fluid is used to improve the efficiency of a heat pump and/or to heat a second fluid such as hot water. After providing waste heat to the remote heat pump and/or water heater, the heat transfer fluid is cycled through an underground loop portion to provide a relatively constant temperature heat transfer fluid back to the chiller. The cycle then repeats.

The chiller of the first heat exchange loop is effective for providing refrigerated air to a refrigerated and/or freezer space. Preferred chillers use a variation of a conventional refrigeration cycle to provide the needed cold air. However, as indicated herein, the chiller is connected to an underground earth loop and to other components that may function as one or more of the components of a conventional refrigeration cycle, such as a condenser. Regardless of the details of the chiller used, the chiller uses the first heat transfer fluid to cool air for the refrigerated and/or freezer space and the first heat transfer fluid absorbs heat during that cooling process.

A desuperheater may be associated with the chiller in the first heat exchange loop. The desuperheater takes on and carries waste heat that is produced by the chiller.

An air-to-liquid hybrid heater may be associated with the chiller to extract additional waste heat from the air around the chiller and/or other heat-generating components and then to transfer that waste heat to the heat transfer fluid. Portions of the chiller and/or the desuperheater and/or the air-to-liquid hybrid heater and/or other mechanical equipment (such as fan motors, etc.) may be housed and confined in a temperature containment mechanical room of the type described herein.

iii) Manifold and Valves.

The first earth loop heat exchange system of the present invention may include a manifold for selectively directing heat transfer fluid from the first chiller to one or more other functional elements. If used, the manifold may be controlled by a microprocessor that opens and closes valves to selectively direct the heat transfer fluid to or from one or more selected functional elements.

A microprocessor may be used to direct the water/refrigerant carried waste heat to predetermined preprogrammed destinations. For example, waste heat may be directed to in-store domestic hot water, a car wash, or a Laundromat according to predetermined prioritized destination instructions. The predetermined prioritized destination instructions automatically route waste heat according to user preferences for utilization as needed. This automated system is especially useful in geographical locations affected by extreme seasonal temperature changes that cause variations in demand for waste heat for ancillary functions. For example, parking lot snow and ice melting may have a high demand and/or priority in the wintertime, while in the summertime demand for hot water may be heavy for a car wash.

The first heat exchange loop may additionally comprise one or more valves for selectively controlling the flow of the heat transfer fluid through the system. In particular, the valves may control the flow of heat transfer fluids to and from the heat pump such that the heat transfer fluid may be directed to the heat pump from either the first heat exchange loop or the second heat exchange loop, or both, and may be directed from the heat pump to either the first pipe loop or the second pipe loop, or both. It is anticipated that the heat pump will utilize the first pipe loop during the winter then the heat pump is providing warm air, and will utilize the second pipe loop during the summer when the heat pump is providing cool air.

iv) Heat Pump

The first earth loop heat exchange system of the present invention also preferably comprises a heat pump that may use the first heat transfer fluid to warm air for a living or working space when heating is desired for the living/working space. The heat pump may also be effective for using a second heat transfer fluid to cool air for a living or working space when cooling is desired for the living/working space.

v) Water Heaters and Other Uses of Waste Heat.

The first earth loop heat exchange system of the present invention may also include additional functional elements that may comprise one or more water heaters effective for using the first heat transfer fluid to transfer heat to a fluid differing in composition from the heat transfer fluid. The fluid heated by the first water heater may be water as the name suggests, but it alternatively may be another fluid.

The first earth loop heat exchange system of the present invention may also comprise additional functional elements, such as additional water heaters effective for using the first heat transfer fluid to transfer heat to one or more other fluids differing in composition from the heat transfer fluid. As before, the fluid heated by such water heater(s) may be water or it may be one or more other fluids.

b. Second Heat Exchange Loop

In addition to the above, the cooling and heating system of the present invention may additionally comprise a second heat exchange loop. The second heat exchange loop may comprise a second heat transfer fluid contained in a second pipe loop effective for passing the second heat transfer fluid between an optional underground portion and the heat pump of the first earth loop heat exchange system. The second pipe loop may have structural features similar to the features of the first pipe loop, such as being made of plastic pipe and having an underground portion that extends into the ground to a depth of at least 5 feet, and more preferably to a depth of at least 10 feet. The underground portion preferably has an input and an output, which may be the same as, or different from, the input and/or output of the first pipe loop.

The second pipe loop is adapted to interconnect with the heat pump of the first heat exchange loop. Most preferably, the heat pump is interconnected to the two heat exchange loops such that waste heat may be directed to the heat pump during the heating season, but that waste heat is not directed to the heat pump during the cooling season. During the cooling season, the heat pump may be connected to the second underground earth loop to provide cool heat transfer fluid to the heat pump.

As discussed above, the second heat exchange loop may additionally comprise one or more valves for selectively controlling the flow of the heat transfer fluid through the heat pump such that the heat transfer fluid may be directed from the heat pump to either the first pipe loop or the second pipe loop, or both. It is anticipated that the heat pump will utilize the first pipe loop during the winter then the heat pump is providing warm air, and will utilize the second pipe loop during the summer when the heat pump is providing cool air.

c. Embodiments Illustrated by the Drawings

Figure 2:
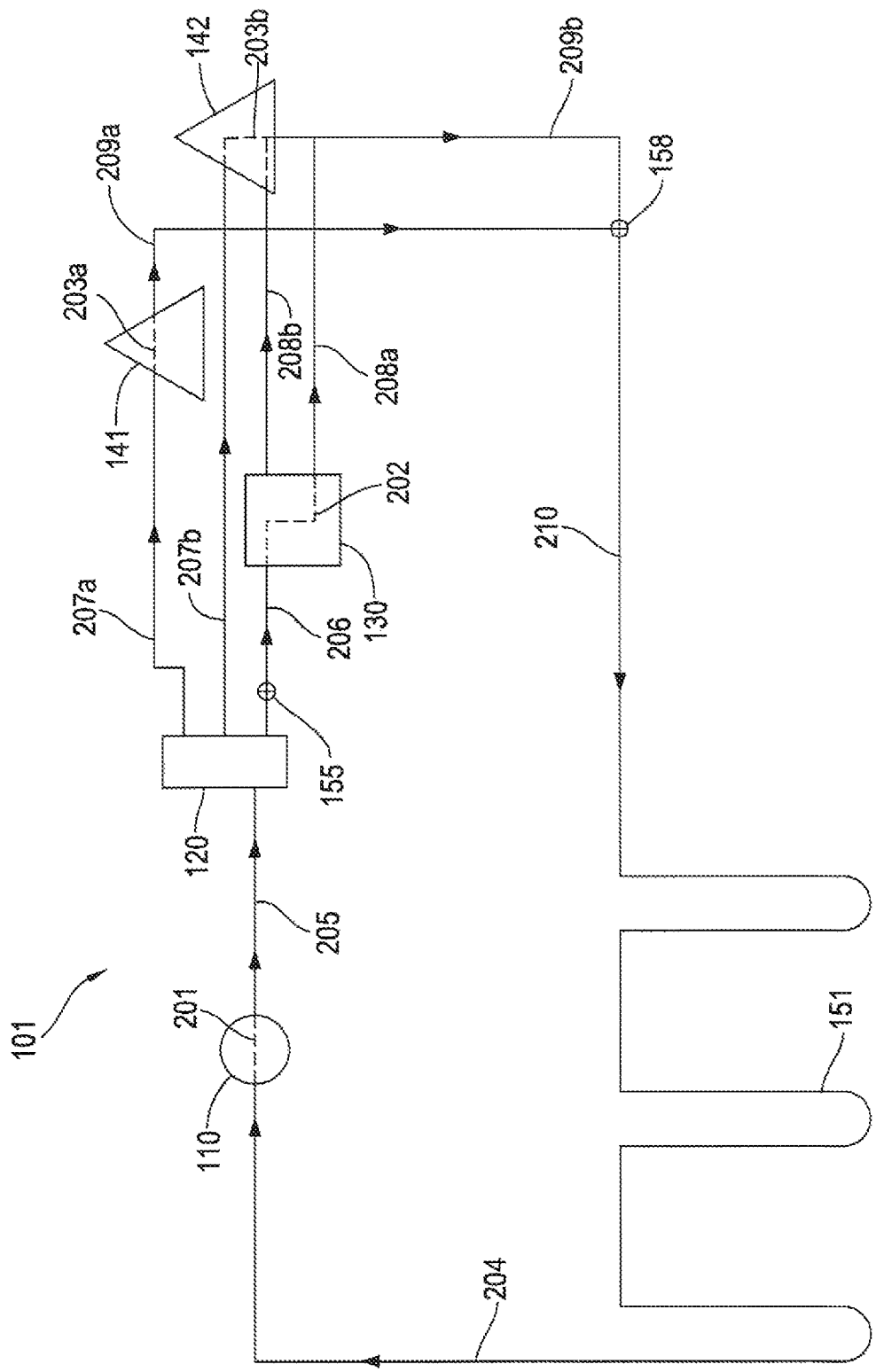
FIG. 2 is a diagram of a first heat exchange loop according to one embodiment of the present invention.

With reference to FIGS. 1 and 2, one embodiment of the inventive heating and cooling system includes a first heat exchange loop and a second heat exchange loop. A first heat transfer fluid (not shown) is contained in a first pipe loop 101 that is effective for passing the first heat transfer fluid between a set of functional elements. The illustrated functional elements include a chiller 110, a heat pump 130, and one or more water heaters such as water heaters 141 and 142. A manifold 120 may be included to direct the heat transfer fluid from chiller 110 to heat pump 130 and one or more water heaters.

Chiller 110 is preferably effective for providing cold air to a refrigerated space and/or to a freezer space, such as a walk-in cooler or a walk-in freezer used by a convenience store. Chiller 110 uses the heat transfer fluid flowing through first pipe loop 101 to absorb heat from air that is then blown into the refrigerator/freezer space. Heat may be absorbed into the heat transfer fluid by passing the fluid through a refrigeration cycle. The refrigeration cycle may include compressor and/or condenser and/or expansion valve and/or evaporator components that cooperate to allow the heat transfer fluid to absorb heat from air passing through the chiller, thus cooling that air. The cooled air is then directed to the space to be refrigerated. The heat transfer fluid that has been used in the chiller refrigeration cycle has "waste" heat that has been absorbed from the air passing through the chiller. The heat is referred to as "waste" heat because it is a by-product of the refrigeration process and is not generally otherwise desired. The heat transfer fluid containing that waste heat is then transferred to a remote location where it may be used to heat water and/or air for a living or working space.

Heat pump 130 is preferably a heat pump that provides warm air to a living or working space when warm air is desired, and that provides cool air to a living or working space when cool air is desired. The efficiency of heat pump 130 is improved when in heating mode by transferring at least some of the waste heat in the heat transfer fluid to the heat pump. Heat pump 130 may utilize the first heat transfer fluid as a fluid that is compressed and/or condensed to provide heat that is transferred to air and blown into the space being heated. Alternatively, the heat pump may be in thermal contact with the heat transfer fluid to facilitate the transfer of waste heat from the heat transfer fluid to the air being heated by the heat pump. Heat pump 130 may be in the same building or store that is being cooled by chiller 110, or it may be in another place.

Water heaters 141 and/or 142 are preferably devices that heat water for use by occupants or customers, such as for drinking or cooking or cleaning. Examples of cleaning uses includes cleaning laundry and cleaning vehicles, as well as cleaning dishes and/or hands. Water heaters 141 and 142 may be in thermal contact with the first heat transfer fluid to facilitate the transfer of waste heat from the heat transfer fluid to the water being heated by the water heater.

Each of the water heaters 141 and 142 may be in the same building or store that is being cooled by chiller 110 and/or heated or cooled by heat pump 130, or they may be in another place. Water heaters 141 and 142 may heat water for use above ground, or they may heat water for use below ground such as to melt ice or snow on a sidewalk, driveway, or parking lot.

A manifold 120 may be included in first pipe loop 101 for selectively directing heat transfer fluid from chiller 110 to one or more of the other functional elements. Manifold 120 may include valves appropriate for selectively directing the heat transfer fluid from the manifold to one or more of the functional elements, and for selectively directing heat transfer fluid to the manifold from chiller 110 and/or from some other source.

A dessuperheater 170 may be associated with chiller 110 to recapture some of the heat that would otherwise be lost to the environment.

An air-to-water heater 180 may also be associated with chiller 110 and/or desuperheater 170 to recapture waste heat that would otherwise be lost to the environment (air) surrounding chiller 110 and/or desuperheater 170.

The desuperheater 170 and/or the air-to-water heater 180 are confined in a mechanical room providing the thermal confinement properties of refrigeration and freezing rooms/boxes described below.

At least a portion of first pipe loop 101 is preferably contained in a building such as a convenience store 190.

The flow of heat transfer fluid amongst and between the various components may be controlled by valves, such as valve 155 that controls the flow of heat transfer fluid from manifold 120 to heat pump 130, valve 156 that controls the flow of heat transfer fluid from heat pump 130 to manifold 120, valve 158 that controls the flow of heat transfer fluid into underground earth loop portion 152, and valve 157 that controls the flow of heat transfer fluid out of underground earth loop portion 152. With valves 157 and 158, a single heat transfer fluid may be passed through underground loop portions 151 and 152, or the heat transfer fluid flowing through underground loop portion 151 may be isolated from the heat transfer fluid flowing through underground loop portion 152.

As more particularly shown by FIG. 2, first heat exchange loop 101 includes an underground portion 151 extending into the ground to a depth of at least 5 feet and having an input and an output. A chiller portion 201 passes through first chiller 110 in a manner effective for utilizing the first heat transfer fluid to chill air. A first heat pump portion 202 passes through heat pump 130 in a manner effective for selectively utilizing the first heat transfer fluid to heat air for a living or working space. A first water heater portion 203a passes through water heater 141 in a manner effective for utilizing the first heat transfer fluid to heat a fluid in said water heater 141, and a second water heater portion 203b passes through water heater 142 in a manner effective for utilizing the first heat transfer fluid to heat a fluid in water heater 142. An underground-to-chiller portion 204 passes the heat transfer fluid from underground portion 151 to first chiller 110. A chiller-to-manifold portion 205 passes the heat transfer fluid from first chiller 110 to manifold 120. A manifold-to-heat pump portion 206 passes the heat transfer fluid from manifold 120 to heat pump 130. A manifold-to-water heater portion 207a passes the heat transfer fluid from manifold 120 to first water heater 141. A first heat pump-to-underground portion 208a passes the heat transfer fluid from heat pump 130 to underground portion 151 of first pipe loop 101, and a water heater-to-underground portion 209a passes the heat transfer fluid from first water heater 141 to the underground portion 151 of first pipe loop 101.

It is to be appreciated that any number of further functional elements may also be provided in pipe loop 101. When present, such functional elements are adapted to utilize some or all of the waste heat that remains in said first heat transfer fluid. For example, such additional functional elements may comprise additional water heaters like water heaters 141 and 142 that are effective for using the first heat transfer fluid to transfer heat to a fluid differing in composition from said heat transfer fluid. Here too, that fluid is preferably but not necessarily water. The hot water may be used to supply potable or non-potable hot water to a laundry, and/or a car wash, and/or to provide potable hot water for cooking or human consumption.

As indicated above, the additional functional elements may heat something other than water, and may even heat something other than a liquid. For example, in one embodiment one of the additional functional elements radiates heat directly to the ground to melt ice and snow from a walkway and/or parking area by direct heat transfer.

Moreover, the additional functional elements may be located essentially any place that is connected to the other elements by pipe loop 101. For example, any of them may be in the building that is heated/cooled by heat pump 130, or they may be outside that building. They may be above the ground, or they may be below the ground. In one embodiment one of the additional functional elements is a pipe loop that melts ice and snow from a walkway and/or parking area by direct heat transfer with the ground.

Figure 3:
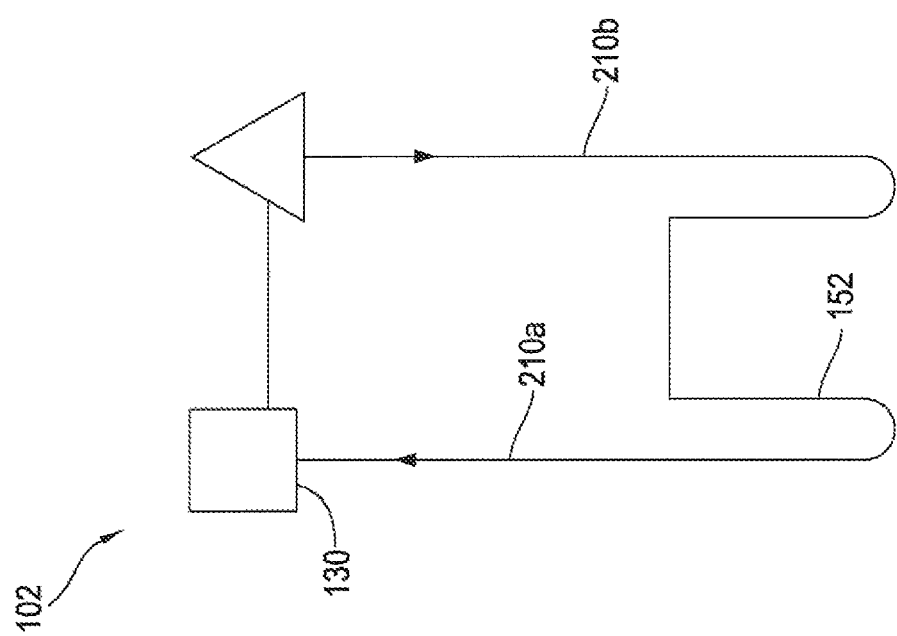
FIG. 3 is a diagram of a second heat exchange loop according to one embodiment of the present invention.

As shown in FIGS. 1 and 3, the cooling and heating system of the present invention also preferably comprises a second heat exchange loop. The second heat exchange loop may comprise a second heat transfer fluid (not shown) contained in a second pipe loop 102 effective for passing that second heat transfer fluid between an underground portion 152 of the pipe loop and the heat pump 130 that is also associated with the first earth loop heat exchange system. The underground portion 152 of second pipe loop 102 preferably extends into the ground to a depth of at least 5 feet, and more preferably extends at least 10 feet into the ground, as previously described. An input and an output are associated with underground portion 152.

The second earth loop system is particularly suited for assisting heat pump 130 when the heat pump is in its cooling mode. In that case waste heat from the chiller of the first heat exchange loop is preferably not directed to heat pump 130 through manifold 120, and instead all of the waste heat is directed to water heaters such as water heaters 141 and/or 142, or to first earth loop pipes 151. Second earth loop pipes 102, including second underground portion 152, provide cool heat transfer fluid to heat pump 130 to assist in the cooling process. If desired, second heat exchange loop 102 may include one or more uses of waste heat, such as water heaters 141 and/or 142, with the waste heat being provided by heat from heat pump 130 or associated components.

One or more valves may be provided in pipe loop 101 and/or pipe loop 102 for selectively controlling the flow of the heat transfer fluid through said first heat pump such that the heat transfer fluid may be directed from said first heat pump to either said first pipe loop or said second pipe loop, or both.

In some embodiments the heat transfer fluid passes from underground loop portion 151 to chiller 110 through pipe loop 204 at a temperature of about 50-60° F. The heat transfer fluid is utilized in chiller 110 to cool air, and the heat transfer fluid gains heat during that process. The heat transfer fluid may leave chiller 110 at a temperature of between 100° F. and 140° F., such as about 120° F. The heat transfer fluid is subsequently directed to manifold 120.

Manifold 120 directs the heat transfer fluid to one or more functional elements, such as heat pump 130 and/or water heaters 141 and/or 142 in the manner previously described. After transferring heat to the functional element(s), the heat transfer fluid returns to underground loop portion 152 where it gives or receives heat to/from the ground. The heat transfer fluid again passes though underground loop portion 152 and is returned to chiller 110 at a temperature of about 50-60° F.

Figure 4:
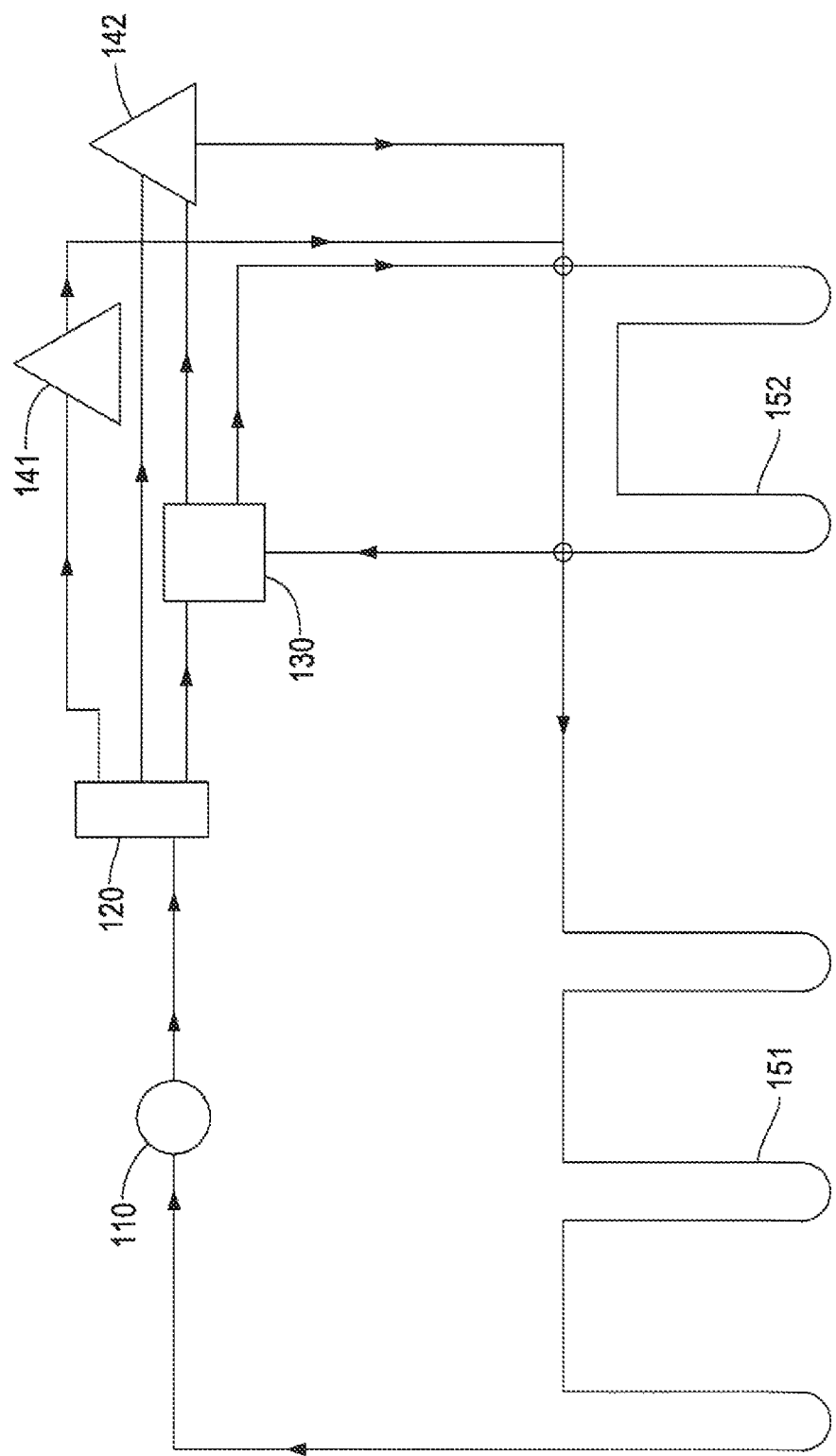
FIG. 4 is a diagram of the combined first and second heat exchange loops according to one embodiment of the present invention.

Referring now to FIG. 4, it is to be appreciated that the first heat exchange loop and the second heat exchange loop may be interconnected to allow a single heat transfer fluid to flow through the combined system. In that case, the first heat exchange fluid will have the same composition as said second heat exchange fluid since the two fluids intermingle. With the interconnected heat exchange loops, waste heat may be collected from chiller 110 in the heating season and may be passed through the first heat exchange loop to heat pump 130. However, during the cooling season heat pump 130 may be isolated from the waste heat produced by chiller 110, and may instead be cooled by the heat transfer fluid passing through the second heat exchange loop.

Figure 5:
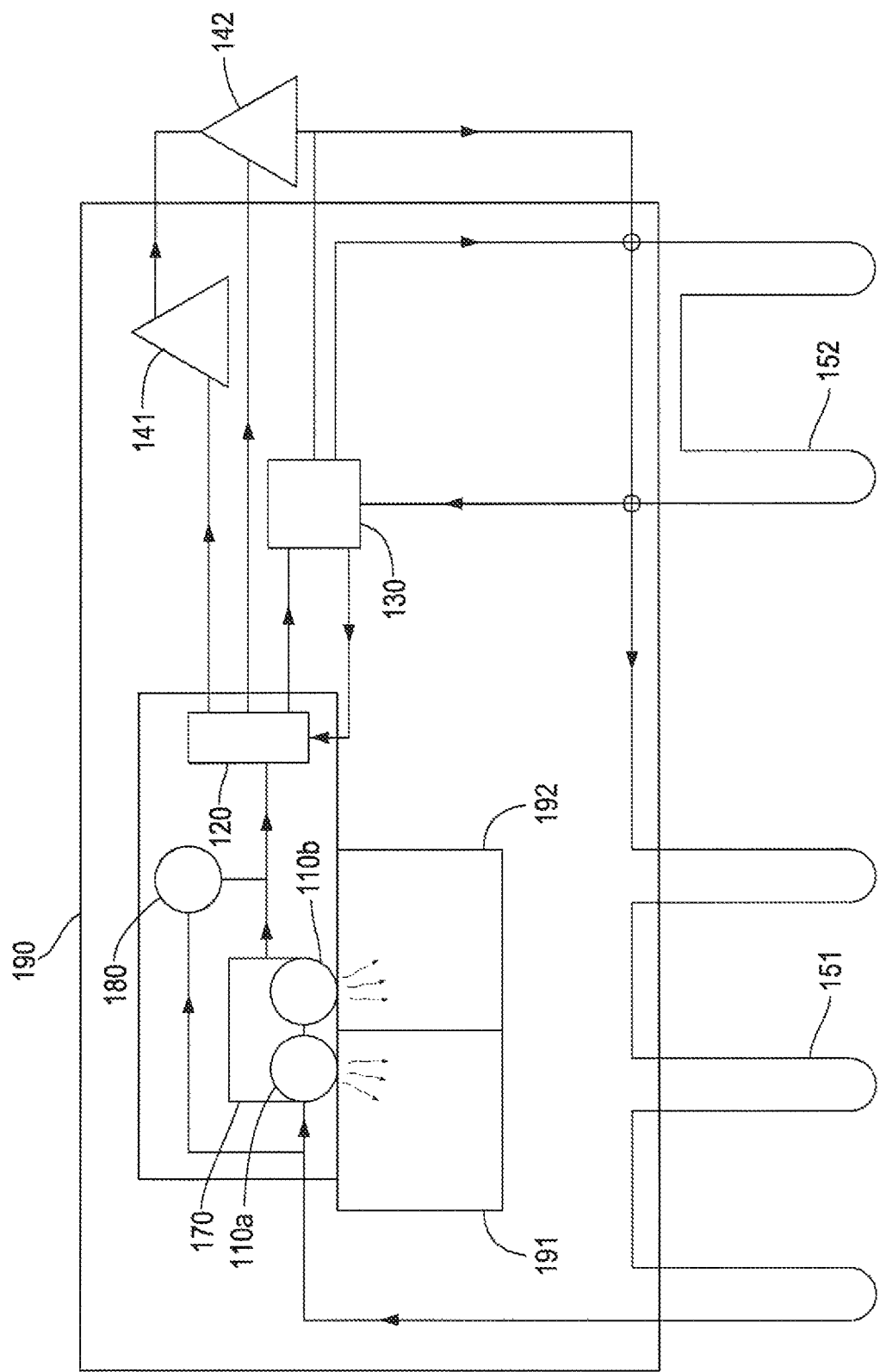
FIG. 5 is a diagram of one embodiment of the energy efficient cooling and heating system of the present invention.
Figure 7:
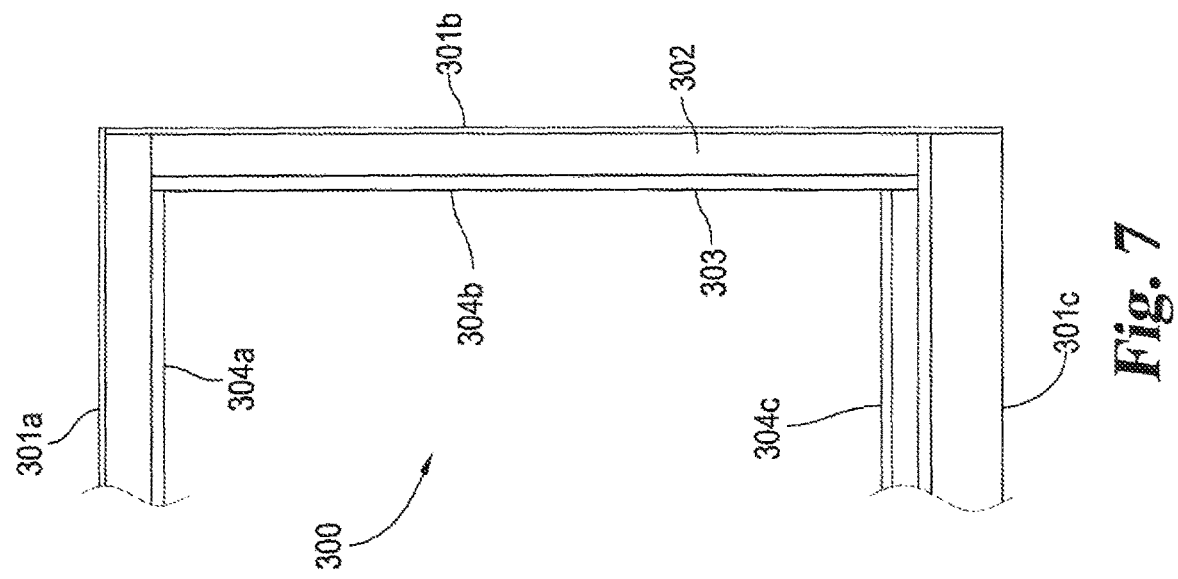
FIG. 7 is a partial side elevational view, in section, of one embodiment of the refrigeration room of the present invention.
Figure 6:
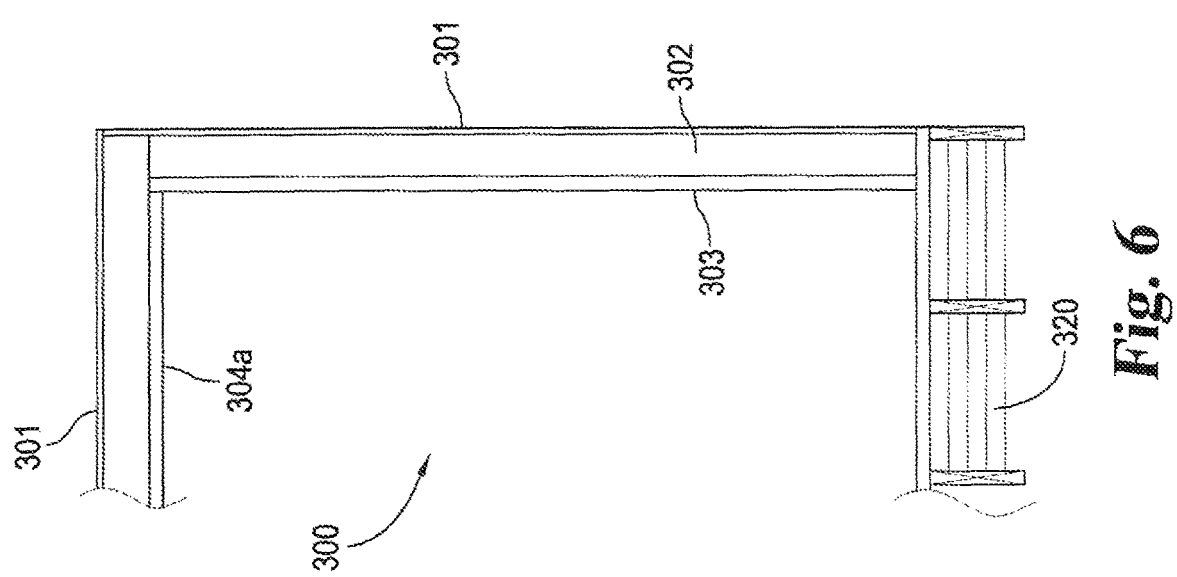
FIG. 6 is a partial side elevational view, in section, of one embodiment of the refrigeration room of the present invention.

Referring now to FIG. 5, it is to be appreciated that the first earth loop heat exchange system may further include both a first chiller 110a and a second chiller 110b. Each chiller may be effective for providing refrigerated air to a refrigerated and/or freezer space. Like the single chiller embodiment, both first chiller 110a and second chiller 110b use the first heat transfer fluid to cool air for a refrigerated and/or freezer space, and the heat transfer fluid absorbs heat during that cooling process.

A desuperheater 170 effective for capturing waste heat that would otherwise be lost from the chilling process may be associated with the two chillers 110a and 110b. Similarly, an air-to-water heater 180 may be associated with the two chillers 110a and 110b and/or with desuperheater 170.

As indicated by the drawing and description above, one aspect of the invention provides a heating and refrigeration system, comprising:

a) a geothermal earth loop heat exchanger comprising an interconnected set of pipe loops extending into the ground to a depth of at least 5 feet, and having a first input, a first output, a second input, and a second output;

b) a closed refrigerant piping system to pipe a fluid refrigerant from said geothermal earth loop heat exchanger output to heating and/or cooling units removed from said geothermal earth loop heat exchanger, and thereafter to return said fluid refrigerant to said geothermal earth loop heat exchanger input, said closed refrigerant piping system comprising:

i) a first portion to pass fluid refrigerant from the first output of said geothermal earth loop heat exchanger to a cooling unit;

ii) a second portion to pass fluid refrigerant from said cooling unit to a water heating unit, iii) a third portion to pass fluid refrigerant from said water heating unit to said geothermal heat pump;

iv) a fourth portion to pass fluid refrigerant from said geothermal heat pump to said first input of said geothermal earth loop heat exchanger;

v) a fifth portion to pass fluid refrigerant from said geothermal earth loop heat exchanger to said geothermal heat pump; and vi) a sixth portion to pass fluid refrigerant from said water heating unit to said second input of said geothermal earth loop heat exchanger;

said closed refrigerant piping system combining with said geothermal earth loop heat exchanger to form a combined refrigerant piping system;

c) a fluid refrigerant contained in said combined refrigerant piping system;

d) a cooling unit that uses as the fluid refrigerant contained in said combined refrigerant piping system to cool air passing through said cooling unit, thus heating the fluid refrigerant used to cool said air;

e) a water heating unit that uses some of the heat contained in said first heated fluid refrigerant to heat water passing through said heating unit, thus cooling the fluid refrigerant used to heat water;

f) a geothermal heat pump that uses said fluid refrigerant to heat or cool a building space;

g) a first valve to selectively open and close said third refrigerant piping system portion, and thus to allow or deny fluid refrigerant from passing from said water heating unit to said geothermal heat pump;

h) a second valve to selectively open and close said fifth refrigerant piping system portion, and thus to allow or deny fluid refrigerant from passing from said geothermal earth loop heat exchanger to said geothermal heat pump; and i) a third valve to selectively open and close said sixth refrigerant piping system portion, and thus to allow or deny fluid refrigerant from passing from said water heating unit to said second input of said geothermal earth loop heat exchanger.

Another aspect of the invention provides a method for heating and cooling, comprising:

a) providing a heating and refrigeration system, comprising:

i) a geothermal earth loop heat exchanger comprising an interconnected set of pipe loops extending into the ground to a depth of at least 5 feet, and having a first input, a first output, a second input, and a second output;

ii) a closed refrigerant piping system to pipe a fluid refrigerant from said geothermal earth loop heat exchanger output to heating and/or cooling units removed from said geothermal earth loop heat exchanger, and thereafter to return said fluid refrigerant to said geothermal earth loop heat exchanger input, said closed refrigerant piping system comprising:

a) a first portion to pass fluid refrigerant from the first output of said geothermal earth loop heat exchanger to a cooling unit;

b) a second portion to pass fluid refrigerant from said cooling unit to a water heating unit, c) a third portion to pass fluid refrigerant from said water heating unit to said geothermal heat pump;

d) a fourth portion to pass fluid refrigerant from said geothermal heat pump to said first input of said geothermal earth loop heat exchanger;

e) a fifth portion to pass fluid refrigerant from said geothermal earth loop heat exchanger to said geothermal heat pump; and f) a sixth portion to pass fluid refrigerant from said water heating unit to said second input of said geothermal earth loop heat exchanger;

said closed refrigerant piping system combining with said geothermal earth loop heat exchanger to form a combined refrigerant piping system;

iii) a fluid refrigerant contained in said combined refrigerant piping system;

iv) a cooling unit that uses as the fluid refrigerant contained in said combined refrigerant piping system to cool air passing through said cooling unit, thus heating the fluid refrigerant used to cool said air;

v) a water heating unit that uses some of the heat contained in said first heated fluid refrigerant to heat water passing through said heating unit, thus cooling the fluid refrigerant used to heat water;

vi) a geothermal heat pump that uses said fluid refrigerant to heat or cool a building space;

vii) a first valve to selectively open and close said third refrigerant piping system portion, and thus to allow or deny fluid refrigerant from passing from said water heating unit to said geothermal heat pump;

viii) a second valve to selectively open and close said fifth refrigerant piping system portion, and thus to allow or deny fluid refrigerant from passing from said geothermal earth loop heat exchanger to said geothermal heat pump; and ix) a third valve to selectively open and close said sixth refrigerant piping system portion, and thus to allow or deny fluid refrigerant from passing from said water heating unit to said second input of said geothermal earth loop heat exchanger.

b) passing said fluid refrigerant through at least part of said geothermal earth loop heat exchanger to adjust said fluid refrigerant to a first temperature;

c) passing said fluid refrigerant from said geothermal earth loop heat exchanger to said cooling unit and using the fluid refrigerant to cool air passing through said cooling unit, thus heating the fluid refrigerant used to cool said air a second temperature greater than said first temperature;

d) passing said fluid refrigerant from said cooling unit to said water heating unit and using some of the heat contained in said fluid refrigerant to heat water passing through said heating unit, thus cooling the fluid refrigerant to a third temperature lower than said second temperature;

e) optionally passing said fluid refrigerant from said water heating unit to said geothermal heat pump and using said fluid refrigerant to heat or cool a building space;

f) returning said fluid refrigerant to said geothermal earth loop heat exchanger; and g) if said fluid refrigerant was not optionally passed from said water heating unit to said geothermal heat pump, passing said fluid refrigerant from said geothermal earth loop heat exchanger to said geothermal heat pump and using said fluid refrigerant to heat or cool a building space, and subsequently returning said fluid refrigerant to said geothermal earth loop heat exchanger.

It is to be appreciated that in one embodiment of the present invention the refrigeration or freezing chiller 110 may provide cold air to an energy-efficient refrigeration room of the type described in the relevant discussion below.

As indicated above, in some embodiments of the present invention the ground loop systems are optional. Accordingly, in another aspect of the invention there is provided a cooling and heating system, comprising a first heat exchange loop and a second heat exchange loop; wherein:

a) said first heat exchange loop comprises:

a first heat transfer fluid, contained in a first pipe loop effective for passing said first heat transfer fluid between a set of functional elements remote from each other, wherein said first pipe loop optionally includes an underground portion extending into the ground to a depth of at least 5 feet and having an input and an output;

a first functional element comprising a first chiller effective for providing refrigerated air to a refrigerated and/or freezer space, wherein said first chiller uses said first heat transfer fluid to cool air for the refrigerated and/or freezer space, and wherein said first heat transfer fluid absorbs heat during that cooling process;

a manifold for selectively directing heat transfer fluid from said first chiller to one or more remote functional elements;

a second functional element comprising a heat pump effective for receiving said first heat transfer fluid and for using said first heat transfer fluid to warm air for a living or working space when heating is desired for the living/working space, and additionally effective for using a second heat transfer fluid to cool air for a living or working space when cooling is desired for the living/working space; and a third functional element comprising a first water heater that uses said first heat transfer fluid to transfer heat to a first fluid differing in composition from said heat transfer fluid;

b) said second heat exchange loop comprises a second heat transfer fluid contained in a second pipe loop effective for passing said second heat transfer fluid between the second heat exchange loop and the heat pump of said first heat exchange system, wherein said second pipe loop optionally includes an underground portion extending into the ground to a depth of at least 5 feet and having an input and an output, and c) valves for selectively controlling the flow of said first and second heat transfer fluids to and from said first heat pump such that heat transfer fluid may be directed to or from said first heat pump to or from either said first pipe loop or said second pipe loop, or both.

The cooling and heating system described above may be adapted so that the first heat exchanger and the second heat exchanger are interconnected to allow a single heat transfer fluid to flow through the combined system, and wherein the first heat exchange fluid has the same composition as the second heat exchange fluid.

The cooling and heating system described above may be adapted so that the first earth loop heat exchange system further includes a second chiller effective for providing refrigerated air to a refrigerated and/or freezer space, wherein the second chiller uses the first heat transfer fluid to cool air for the refrigerated and/or freezer space, and wherein the first heat transfer fluid absorbs heat during that cooling process.

The cooling and heating system described above may be adapted so that the first earth loop heat exchange system further includes a desuperheater effective for capturing waste heat that would otherwise be lost from the chilling process.

The cooling and heating system described above may be adapted so that the first earth loop heat exchange system further includes an air-to-water heater effective for capturing waste heat from the chiller(s) and/or the desuperheater.

The cooling and heating system described above may be adapted so that the first earth loop heat exchange system further includes a microprocessor to control the flow of fluid through said manifold.

The cooling and heating system described above may be adapted so that the first earth loop heat exchange system further includes a fourth functional element comprising a second water heater effective for using the first heat transfer fluid to transfer heat to a second fluid differing in composition from said heat transfer fluid.

The cooling and heating system described above may be adapted so that the first fluid differs in composition from said heat transfer fluid is water.

The cooling and heating system described above may be adapted so that the second fluid differs in composition from said heat transfer fluid is water.

The cooling and heating system described above may be adapted so that the first pipe loop includes:
- a chiller portion passing through said first chiller in a manner effective for utilizing said first heat transfer fluid to chill air;
- a first heat pump portion passing through said heat pump in a manner effective for selectively utilizing said first heat transfer fluid to heat air for a living or working space;
- a first water heater portion passing through said water heater in a manner effective for utilizing said first heat transfer fluid to heat a fluid in said water heater:
- a optional portion effective for passing said heat transfer fluid from any underground portion to said first chiller;
- a chiller-to-manifold portion effective for passing said heat transfer fluid from said first chiller to said manifold;
- a manifold-to-heat pump portion effective for passing said heat transfer fluid from said manifold to said heat pump;
- a manifold-to-water heater portion effective for passing said heat transfer fluid from said manifold to said first water heater;
- an optional first heat pump-to-underground portion effective for passing said heat transfer fluid from said heat pump to an underground portion of said first pipe loop through; and
- an optional water heater-to-underground portion effective for passing said heat transfer fluid from said first water heater to an underground portion of said first pipe loop.

The cooling and heating system described above may be adapted so that the said second pipe loop includes an optional second heat pump-to-underground portion effective for passing said heat transfer fluid from said heat pump to an underground portion of said first pipe loop.

The cooling and heating system described above may be adapted so that the pipe loop includes a heat pump-to-manifold portion effective for passing heat transfer fluid from said heat pump to said manifold, wherein said heat pump-to-manifold portion differs from said manifold-to-heat pump portion.

The cooling and heating system described above may be adapted so that the chiller provides cold air to a refrigerated room, wherein said refrigerated room comprises:
a) an outer wall layer;
b) a framing layer defining a series of spaces having a depth of at least 6" inside the outer wall layer;
c) an outer insulation layer comprising insulation that has been sprayed into the framing layer spaces;
d) a middle wall layer preferably comprising plywood sheets;
e) an inner insulation layer comprising a foamboard insulation material;
f) an inner wall layer;
g) a door sized to permit walk-in access to the interior chilled air space;
h) one or more functional openings to permit electrical connections and/or chilled air to enter or exit the chilled air space;
wherein the inner wall layer forms an air-tight envelope when any doors or windows in the inner wall layer are closed; and
wherein the outer insulation layer and the inner insulation layer overlap in a manner that does not contain any insulation gaps or thermal bridges.

In embodiments that do not include a ground loop system it may be useful to include an alternative heat exchanger to capture waste heat. Accordingly, it may be useful to include a heat exchanger system effective to take the heated air and capture some or a majority of the heat into a liquid or air or other heat-retaining material for use in another place or for storage for later.

A containment system may also be included to retain the released waste heat for a time long enough to bring heat energy into a circulating liquid loop system. The system may delay the release of heat into the system, and would preferably not release waste heat to the extent that such release would retard the efficiency of the primary cooling system. The containment/heat capturing system may use a housing to force air movement around the exhaust of the primary cooling system efficiently and effectively using a heat exchanger to transfer the waste heat to use or for storage.

2. Refrigeration Room.

With reference to FIGS. 6 through 11, one aspect of the refrigeration and/or freezer room of the present invention comprises a closed enclosure 300 comprising:
a) an outer wall layer 301 comprising an outer ceiling layer 301a, an outer sidewall layer 301b, and an optional outer floor layer 301c;
b) an outer insulating layer 302 comprising a closed cell insulation material that has been sprayed onto the inner surfaces of the outer wall layer, wherein said closed cell insulation material is contained in a framed space;
c) an inner insulation layer 303 comprising a rigid foamboard insulation material; and
d) an inner wall layer 304 comprising an inner ceiling 304a, an inner sidewall 304b, and an inner floor 304c.

The inner wall layer preferably forms an envelope having essentially no gaps when any openings in the inner wall layer are closed. Moreover, the outer insulation layer and the inner insulation layer preferably overlap in a manner that does not contain any insulation gaps or thermal bridges other than as necessary to provide access to the room through windows or doors or other functional openings (such as the chiller ducts). By "insulation break" or "thermal bridge" is meant any place where heat may move from within the room to outside the room (or from outside the room to inside the room) at a rate faster than the rate at which heat moves through the insulation material(s).

In one embodiment the outer, closed-cell insulation layer preferably has an R-value of at least about R-30 and preferably at least about R-38, as provided. In one embodiment the inner insulation layer comprising a rigid foamboard insulation material has an R-value of at least R-10, and preferably has an R-value of at least about R-12.

To construct the refrigeration and/or freezer room of the present invention, studs and/or floor and/or ceiling joists are provided adjacent an outer ceiling, sidewall, and flooring layer. The studs and/or joists are preferably 2"×6" (nominal) that provides a 5 to 6" (nominal) deep space into which insulation may be sprayed, preferably to form the outer insulating layer. Wooden or composite lumber and/or steel "C" channels may be used, with steel "C" channels being particularly preferred in the floor area.

In a preferred embodiment a closed cell R-38 foam insulation is sprayed into the space to provide an outer insulation layer.

Inside that outer insulation layer a second insulation layer is provided. The second insulation is interior to the outer insulation layer, and may be a 2" foil R-12 foamboard insulation. The foamboard insulation layer may have a vapor barrier on one or both sides to prevent moisture from passing through the foamboard and into the adjacent closed cell foam insulation.

Interior ceilings, walls, and floors may be provided adjacent the foamboard insulation to provide a finished or finishable surface.

In another aspect of the present invention a second foamboard insulation layer may be provided on the opposite side of the closed cell foam insulation layer. This provides a "sandwich" in which the closed cell foam insulation layer is surrounded on both side by foamboard insulation that may have a vapor barrier on one or both sides to prevent moisture from passing through the foamboard and into the adjacent closed cell foam insulation.

In one aspect of the present invention the refrigerated room is constructed without the clips, etc., that are used in conventional systems. These clips may provide thermal breaks where heat transfers more easily, making the prior art refrigeration rooms less energy efficient than applicant's rooms that do not have thermal breaks. The inner, foamboard insulation layer, and its attachment to adjacent layers, is particularly preferred to be fastener-free.

In one embodiment of the present invention the refrigerated room may be room sized, such as 10 feet wide by 8 feet tall by 16 feet to 33 feet long. In other embodiments the refrigerated room may be smaller or larger, but the refrigerated rooms of the present invention are sized to accommodate people standing and working therein, and are not portable, hand-held coolers.

In a further embodiment the refrigerated room comprises:
a) an outer wall layer;
b) a framing layer defining a series of spaces having a depth of at least 6" inside the outer wall layer;
c) an outer insulation layer comprising insulation that has been sprayed into the framing layer spaces;
d) a middle wall layer preferably comprising plywood sheets;
e) an inner insulation layer comprising a foamboard insulation material;
g) an inner wall layer;
h) a door sized to permit walk-in access to the interior chilled air space; and
i) one or more functional openings to permit electrical connections and/or chilled air to enter or exit the chilled air space;

wherein the inner wall layer forms an air-tight envelope when any doors or windows in the inner wall layer are closed; and wherein the outer insulation layer and the inner insulation layer overlap in a manner that does not contain any insulation gaps or thermal bridges.

The outer wall layer provides structural support and protects the insulating layers. The outer wall layer may be made of wood, a composite, metal, concrete, or any other material useful for providing walls.

The framing layer preferably comprises wall studs and/or floor or ceiling joists that define one or more spaces having a depth of at least 6", more preferably between 6" and 12", and most preferably between 6" and 8", inside the outer wall layer. The framing layer provides a space for insulation to be sprayed in to provide the outer insulation layer.

The outer insulation layer preferably comprises closed cell insulation that has been sprayed into the framing layer spaces. The closed cell insulation preferably comprises closed-cell insulation having an R-value of at least about R-30 and preferably at least about R-38, as described above.

The middle wall layer preferably comprises plywood sheets that overlay the framing layer and the outer insulation layer on the side opposite the outer wall layer. The middle wall layer provides a surface onto which the inner insulation layer may be installed.

The inner insulation layer preferably comprises a foamboard insulation material as previously described. When multiple boards are used, adjacent sheets are preferably fixed together using spray foam sealant as an adhesive. For example, a polyurethane-based insulating foam sealant such as the product sold by the Dow Chemical Company under the name "Great Stuff" may be used between adjacent skeets of foamboard to seal and hold the sheets together.

The foamboard is preferably attached to the middle wall layer with an adhesive. Accordingly, and as previously described, the inner insulation foamboard layer is preferably installed without using any clips or fasteners, and is therefore "fastener-free." For the purposes of this disclosure, the term "fastener" does not include adhesives such as glues, etc. While the middle layer may be nailed or otherwise fastened to the framing layer, the interface between the foamboard and the middle wall layer is preferably fastener-free.

To construct the inventive refrigerated room the outer wall is provided to provide the appropriate structural support. The framing layer is provided inside the outer wall to create a 4" to 12" space, which is preferably a 5" to 10" space, and is more preferably a 6" to 8" space, for the outer insulation layer to be sprayed. The outer insulation layer of closed cell insulation is then sprayed into the framing layer space and is allowed to dry.

After the sprayed-in foam layer has dried, the middle layer (preferably plywood) can be placed over the outer foam layer. Preferably, the middle plywood payer is attached to the framing layer studs or joists, such as by nailing.

The inner foamboard layer can then be applied over the middle support layer. Appropriately-sized foam boards are cut and are fixed to the middle support layer with an adhesive. Any spaces or gaps between adjacent foam boards are preferably filled with a spray foam sealant/adhesive. Any spaces or gaps between adjacent foam boards are positioned so that they overlay the spray-in foam of the outer insulation layer, and do not overlay studs or joists.

An optional vapor barrier layer is provided over the inner foamboard layer, and an inner wall is then provided over the construction. All gaps or spaces are filled with a spray foam or other insulating material.

Functional openings such as air ducts and electrical connections may be provided, but care is takes to make sure that the space around any such openings is well sealed.

Figure 8:
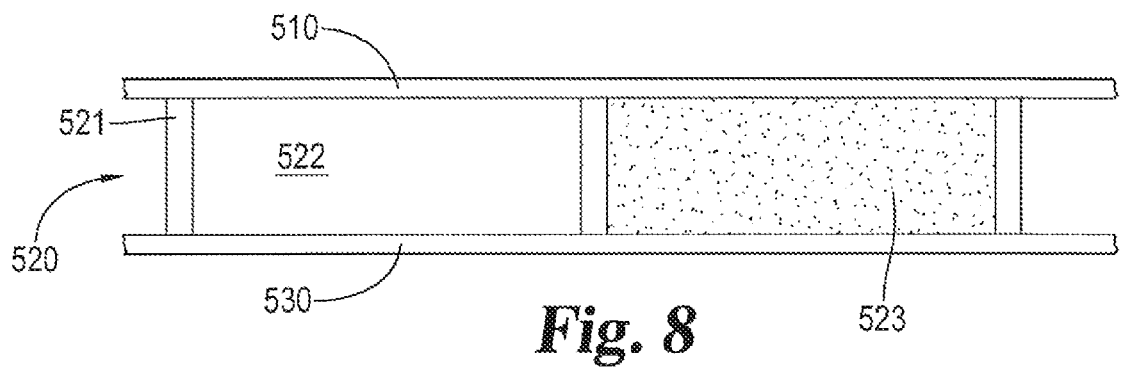
FIG. 8 is an illustration of a framing layer used in one embodiment of the refrigeration room of the present invention.

FIG. 8 illustrates a framing layer used in certain embodiments of the present invention, with an outer insulation layer being provided in certain of the spaces of the framing layer. Framing layer 520 includes studs 521 that define open spaces 522 therebetween. In the illustrated figure, insulation material 523 has been provided in the framing layer spaces as described above. Walls 510 and 530 are provided adjacent framing layer 520.

Figure 9:
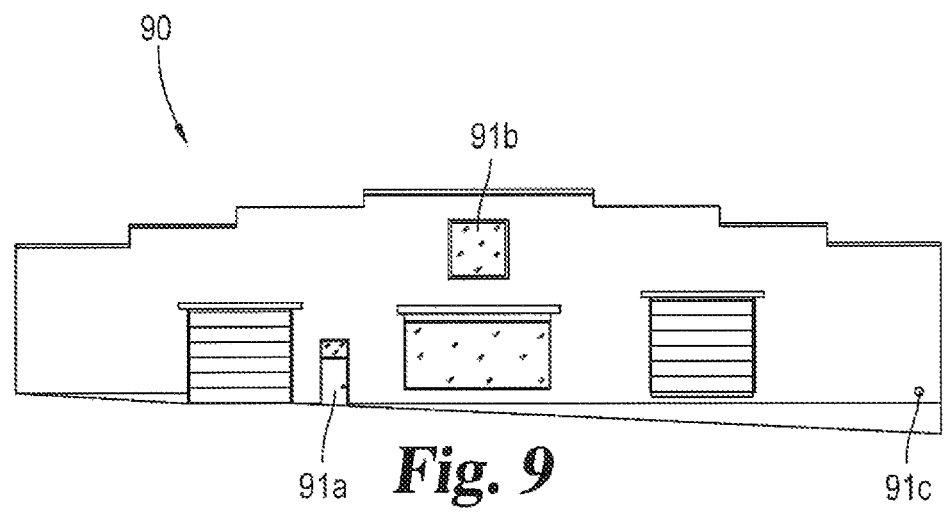
FIG. 9 is an illustration of one embodiment of the refrigeration room of the present invention.

FIG. 9 illustrates a refrigerated room according to one embodiment of the present invention. Room 90 includes functional openings 91 as described above.

Figure 10:
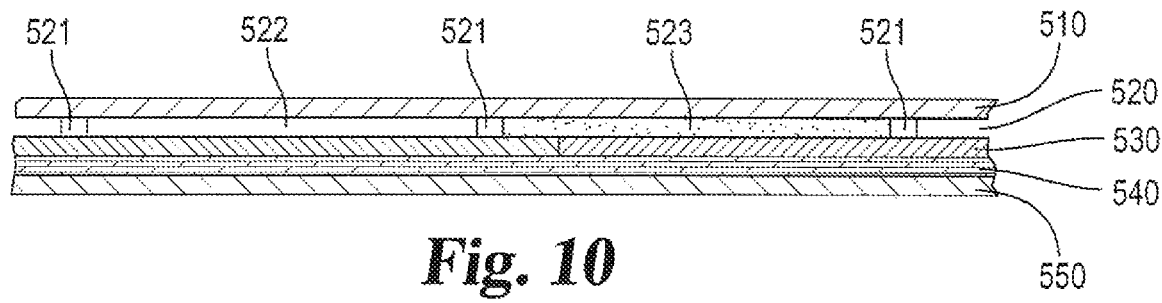
FIG. 10 is an illustration of the various layers used in one embodiment of the refrigeration room of the present invention.

FIG. 10 is an illustration of the various layers used in one embodiment of the refrigeration room of the present invention. Outer wall layer 510 is provided as described herein adjacent framing layer 520. Framing layer 520 included studs 521 defining spaces 522 into which insulation material 523 may be provided. Middle wall layer 530 bounds framing layer 520 on the side opposite outer wall 510, and comprises sheets that overlay the framing layer and the outer insulation layer on the side opposite the outer wall layer. Inner insulation layer 540 comprises a foamboard insulation material. An optional inner wall layer 550 is also provided.

Figure 11:
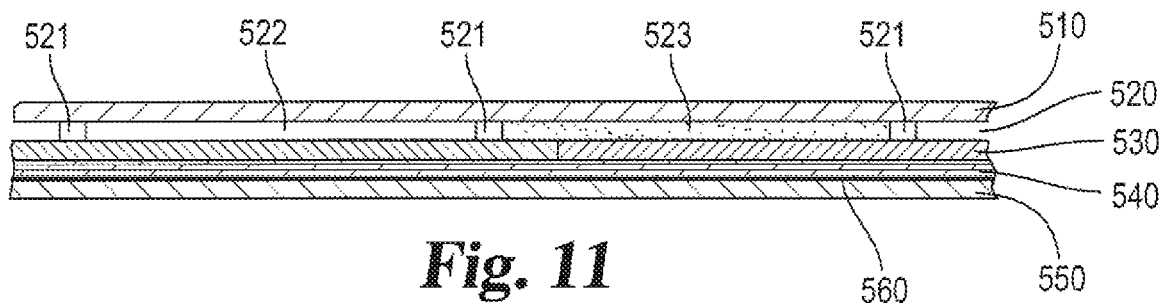
FIG. 11 is an illustration of the various layers used in another embodiment of the refrigeration room of the present invention.

FIG. 11 is an illustration of the various layers of the wall system used in certain embodiments of the refrigeration room of the present invention. The illustrated refrigeration room system uses a wall system comprising outer wall 510, framing layer 520, outer insulation layer 523 contained within the spaces 522 of framing layer 520, middle wall 530, inner insulation layer 540, and inner wall 550, as described herein. Optional vapor barrier layer 560 is also provided.

It is to be appreciated from the description and drawing above that the inventive refrigeration room in which the walls which avoid thermal bridges. Accordingly, one embodiment of the inventive system provides a five-layered "sandwich" having three wall layers and two insulation layers, as follows:

a) an outer wall layer;
  b) an outer insulation layer of insulation that has been sprayed into spaces between wall studs;
  c) a middle wall layer;
  d) an inner insulation layer of foamboard insulation; and
  e) an inner wall layer.

A diagram illustrating the five-layered structure of two insulation layers separated and surrounded by three wall layers is provided below:

| |
|---|
| Outer Insulation Layer (Blown-in insulation between studs) |
| Middle Wall |
| Inner Insulation Layer (Foamboard) |
| Inner Wall |

More particularly describing the various layers, the outer insulation layer has gaps where the frame studs are. In conventional building construction, when sheets of a solid material (such as drywall) are used over a framing layer, the sections are positioned so that their edges overlie these studs to give the edges of the drywall sections more stability. That construction would also be expected if a layer of foamboard were used to cover a framing layer. In such a case, the foamboard sections would be positioned so that their edges would overlie the studs to give the edges of the foamboard sections more stability. However, that construction would introduce insulation gaps and thermal bridges in the spaces between the foamboard sections, thus allowing heat to transfer more easily from the inside of the room to the outside.

A diagram illustrating how the various layers would be positioned using conventional building technology is provided below:

| | | | | |
|---|---|---|---|---|
| Outer Wall | | | | |
| Stud    Insulation | | Stud    Insulation | | Stud |
| Middle Wall section | | Middle Wall section | | |
| Inner Insulation Layer (Foamboard) | | Inner Insulation Layer (Foamboard) section | | |
| Inner Wall | | | | |

As illustrated by the diagram above, with the conventional construction it is possible to go in a straight line from the inner wall to the outer wall without passing through any insulation. This creates the insulation gaps and thermal bridges that applicant's invention seeks to avoid.

A diagram illustrating how the various layers are positioned using applicant's claimed building technology is provided below:

| | | | | |
|---|---|---|---|---|
| Outer Wall | | | | |
| Stud    Insulation | | Stud    Insulation | | Stud |
| Middle Wall section | | Middle Wall section | | |
| Inner Insulation Layer | | Inner Insulation Layer (Foamboard) section | | |
| Inner Wall | | | | |

As illustrated by the diagram, with applicant's construction it is not possible to go in a straight line from the inner wall to the outer wall without passing through insulation because the two insulation layers overlap. This avoids the insulation gaps and thermal bridges that cause cooling inefficiencies.

3. Further Aspects of the Commercial Refrigeration and Freezing Closed Earth Loop Coupled System with Re-Purposed Utilization of Heat Rejection.

It is to be appreciated that one aspect of the present invention provides re-purposed utilization of heat rejection from a commercial refrigeration and freezing closed earth loop coupled system. The present invention applies applicant's geothermal ground source heat pump technology to create a closed earth loop coupled system for commercial refrigeration and freezing with re-purposed utilization of the heat rejection for use in multiple applications, such as to provide heat to the interior conditioned space of a structure, make domestic hot water, and with the potential to produce hot water for a car wash. The commercial refrigeration and freezing closed earth loop coupled system may be used, for example, in convenience stores of approximately 3,500 to 4,500 square feet, and in some larger food stores.

The re-purposed utilization of the heat rejection from the commercial refrigeration and freezing closed earth loop coupled system of the present invention is made possible by the application of additional equipment, optimally designed storage units for high energy efficiency, and improvements to a building's thermal envelope. The smaller convenience stores are ideal candidates, as intended, for a dual or triple Re-purposed utilization of the heat rejection.

When something is refrigerated or frozen, it is the extraction of heat from it that cools it down, to the desired temperature. The ideal temperature for refrigeration is 35 degrees Fahrenheit and −10 degrees Fahrenheit for freezing.

The cooling down process has as its by-product heat rejection that is measured in BTU's.

By way of example, the heat rejection from one 10'×33'×7' refrigeration room may be approximately 48,000 BTU an hour, and the heat rejection from a 10'×16'×7' freezing room may be approximately 33,000 BTU an hour for a combined total heat rejection of approximately 81,000 BTU per hour. This 81,000 BTU per hour of heat rejection, year around, will produce sufficient heat in the winter to warm a 3,500 to 4,500 sq ft convenience store in climates similar to Pennsylvania's climates (0 degrees on the coldest day in winter), produce domestic hot water, and potentially provide sufficient hot water for a car wash.

The inventive refrigeration and freezing storage units/rooms are designed to eliminate interior thermal breaks that exist in conventional panelized rooms. When the thermal envelope design of the refrigeration and freezing rooms is optimal there is less of a load demand on the cooling and freezing processes. Applicant's room may be manufactured as one whole unit with closed cell spray-foam insulation in the walls, ceiling and floor making it more air tight. The closed cell spray foam insulation may be applied in a continuous layer without thermal breaks except for where any doors and/or windows and/or other functional openings are located. To the extent doors and/or windows and/or other functional openings are included, those areas are sealed to minimize thermal/heat transfer. The amount of closed cell spray foam insulation uniformly applied has an R-Value of 50.5, except where the structural wood studs are placed at 16" OC (on center) where there is a lesser R-Value of 18. This process greatly reduces thermal bridging and almost completely eliminates it through the walls, floor, and the ceiling system with the doors as the only exceptions.

Typical prior art standard refrigeration and freezing units have an R-Value of only 28-32 in the walls and ceiling and no insulation in the floor unless a higher R-Value is special ordered. Moreover, in conventional panelized units, the thermal bridging isn't the only negative situation to occur. The gaskets used at the panel joints breakdown over time for many reasons. Where the joints create thermal breaks and the gaskets have broken down, the cooled air from inside of the unit meets with the warmer air from the outside of the unit causing moisture to develop. The moisture will enter the wood studs located at the ends of the panels at the joints and eventually the wood studs will rot.

To protect the inventive units even further from the deteriorating affects of moisture the interior walls of our units may be covered with fiberglass reinforced vinyl sheets (FRV) or fiberglass-reinforced plastic sheets (FRP) to create a vapor barrier and caulked.

To date, attempts made to create a whole storage unit for refrigeration and or freezing have failed because moisture has rotted the wood used to build the structural walls. The inventive units are designed not to fail because the wood may be encapsulated with closed cell, spray foam insulation that acts as a sealant to insulate the wood from absorbing moisture.

The methods for installation of a 33'×10'×7' refrigeration unit and a 16'×10'×7' freezing unit is to lower the unit by crane during the construction process of a new building and or by rolling it into place. It can be rolled into place in an existing structure.

The dual or triple re-purposed utilization of the heat rejection from the refrigeration/freezer chiller has the potential to reduce energy consumption by as much as 50% to 75% compared to the energy consumption of conventional commercial refrigeration and freezing systems, domestic hot water production, and indoor heating (given that the structure's building envelope has also been designed or improved to reduce its heating and cooling load).

The added cost of the equipment for producing domestic hot water and heat for the conditioned interior space of a convenience store should have a short payback period since the captured heat is free and can be used as needed. The likelihood is that the system as a whole will probably be sufficient to supply hot water to a car wash as the third re-purposed utilization of the heat rejection.

While certain preferred embodiments have been described in detail in the foregoing description, the same is to be considered as illustrative and not restrictive in character, it being understood that the preferred embodiment has been shown and described and that all changes, equivalents, and modifications that come within the spirit of the inventions defined by following claims are desired to be protected. It will be evident from the specification that aspects or features discussed in one context or embodiment will be applicable in other contexts or embodiments. In addition, the various elements and/or features may be combined so that the system comprises any or all of those elements and/or features, or so that the system consists of any combination of the disclosed elements and/or features. Further, all publications, patents, and patent applications cited in this specification are herein incorporated by reference as if each individual publication, patent, or patent application were specifically and individually indicated to be incorporated by reference and set forth in its entirety herein.

The invention claimed is:

1. A cooling and heating system, comprising a first heat exchange loop, a second heat exchange loop, and a walk-in refrigeration room system; wherein:
   a) said first heat exchange loop comprises:
      a first heat transfer fluid, contained in a first pipe loop effective for passing said first heat transfer fluid between a set of functional elements remote from each other, wherein said first pipe loop optionally includes an underground portion extending into the ground to a depth of at least 5 feet and having an input and an output;
      a first functional element comprising a first chiller effective for providing refrigerated air to the walk-in refrigeration room system, wherein said first chiller uses said first heat transfer fluid to cool air for the refrigerated and/or freezer space, and wherein said first heat transfer fluid absorbs heat during that cooling process;
      a manifold for selectively directing the first heat transfer fluid from said first chiller to one or more remote functional elements;
      a second functional element comprising a heat pump effective for receiving said first heat transfer fluid and for using said first heat transfer fluid to warm air for a living or working space when heating is desired for the living/working space, and additionally effective for using a second heat transfer fluid to cool air for a living or working space when cooling is desired for the living/working space; and
      a third functional element comprising a first water heater that uses said first heat transfer fluid to transfer heat to a first fluid differing in composition from said first heat transfer fluid;
   b) said second heat exchange loop comprises said second heat transfer fluid contained in a second pipe loop effective for passing said second heat transfer fluid between the second heat exchange loop and the heat pump of said first heat exchange loop, wherein said second pipe loop optionally includes an underground portion extending into the ground to a depth of at least 5 feet and having an input and an output, and c) valves for selectively controlling the flow of said first and second heat transfer fluids to and from said heat pump such that either of said first and second heat transfer fluids may be directed to said heat pump from either said first pipe loop or said second pipe loop, and such that either of said first and second heat transfer fluids may be directed from said heat pump to either said first pipe loop or said second pipe loop, or both;

and wherein the walk-in refrigeration room system is sized to accommodate people standing and working therein, and is effective for defining and maintaining an interior chilled air space, the walk-in refrigeration room system comprising: a) an outer wall layer; b) a framing layer defining a series of spaces having a depth of at least 6" inside the outer wall layer; c) an outer insulation layer comprising insulation that has been sprayed into the framing layer spaces; d) a middle wall layer preferably comprising plywood sheets; e) an inner insulation layer comprising a foamboard insulation material; and g) an inner wall layer; h) a door sized to permit walk-in access to the interior chilled air space; i) one or more functional openings to permit electrical connections and/or chilled air to enter or exit the chilled air space; wherein the inner wall layer forms an air-tight envelope when any doors or windows in the inner wall layer are closed; and wherein the outer insulation layer and the inner insulation layer overlap in a manner that does not contain any insulation gaps or thermal bridges;

wherein the first heat exchange loop is functionally connected to the walk-in refrigeration room system in a manner effective to provide cool air to the walk-in refrigeration room system.

2. A combined cooling and heating system and walk-in refrigeration room according to claim 1, wherein the outer insulating layer has an R-value of at least R-30 as provided, and wherein the inner insulation layer has an R-value of at least about R-10.

3. A combined cooling and heating system and walk-in refrigeration room according to claim 1, and further including a vapor barrier layer comprising fiberglass reinforced vinyl sheets (FRV) or fiberglass-reinforced plastic sheets (FRP), wherein said vapor barrier layer is positioned between said inner insulation layer and said inner wall layer.

* * * * *